April 24, 1945.   A. D. CLYBURN   2,374,421
HOLDER FOR WELDING ELECTRODES
Filed Jan. 5, 1943

INVENTOR
Andrew D. Clyburn
BY John H. Ruckman
ATTORNEY

Patented Apr. 24, 1945

2,374,421

UNITED STATES PATENT OFFICE 2,374,421

HOLDER FOR WELDING ELECTRODES

Andrew D. Clyburn, New Orleans, La., assignor of fifty per cent to Dalton B. Shourds, Gulfport, Miss., Claude E. Hooton, Houston, Tex., and Eugene Mogabgab, New Orleans, La., jointly Application January 5, 1943, Serial No. 471,334

5 Claims. (Cl. 219—8)

My invention relates to holders for welding electrodes. Among the objects of the invention is the provision of a device of this character for use in convenient and efficient burning of welding electrodes with either alternating or direct current. Other objects are to provide a device which is sturdy and yet of light weight, which may be handled with safety by the operator, which is economical to manufacture, which will conserve electrodes, and which is so constructed that the electrode may be firmly held to extend out at different angles from the handle.

The novel features, which I believe to be characteristic of my invention are set forth with particularity in the appended claims. The invention itself, however, both as to organization and method of operating, together with additional objects and advantages thereof, will be best understood from the following description of a particular embodiment of the invention when read in connection with the accompanying drawing in which:

Fig. 3 is a detail view of the head of the device, taken at right angle to the position shown in Fig. 1.

Fig. 4 is a top plan view of the head of the device.

Fig. 5 is a bottom plan view.

Figures 1, 2:
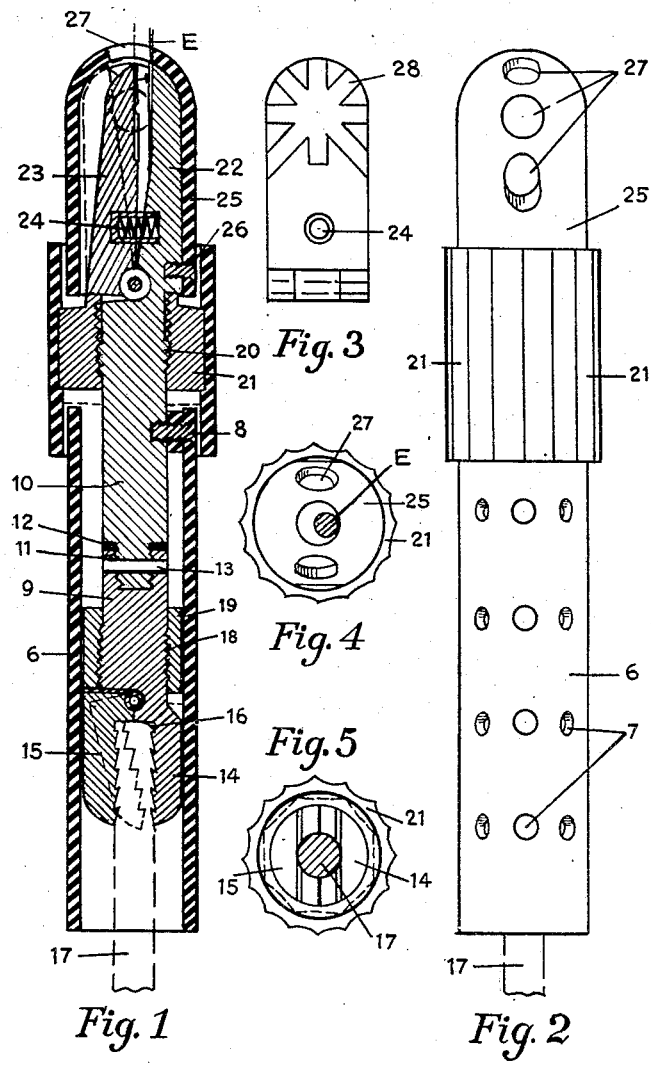
Fig. 1 is a view of the device in central longitudinal section.
Fig. 2 is an elevational view of the device.

Referring to the construction shown in the drawing to illustrate the principles of construction of the device, the numeral 6 designates a cylinder of insulating material for providing a handle and which is preferably provided with a multiplicity of ventilating holes 7. The cylinder 6 near its outer end is provided with a hole for receiving a screw 8 adapted to hold a conducting member in place in the cylinder.

The conducting member consists of a lower part 9 and an upper part 10, the bottom end of the latter having a reduced portion provided with screw threads 11 for engagement in a screw threaded hole in the upper end of the part 9. A washer 12 is shown between the two parts where they abut each other. A pin 13 may be passed laterally through the threaded portion for securely holding the two parts together. The lower end of the member 9 is provided with a fixed jaw 14 and a hinged jaw 15 adapted to be moved away from each other by a spring 16. After a lead-in cable 17 has its upper end placed between the two jaws, the jaws are moved toward each other to firmly grip the cable. For this purpose, the member 9 is provided with screw threads 18 which are engaged by a threaded sleeve 19 which when turned downwardly moves the jaw 15 toward the jaw 14.

The upper member 10 is provided with screw threads 20 which are engaged by a threaded sleeve 21 around which is insulating material. The upper end of the member 10 is provided with a fixed jaw 22 and a hinged jaw 23 adapted to be moved away from each other by an interposed coiled spring 24. These jaws are surrounded by a hood 25 of insulating material held in place by a screw 26 passing therethrough and turned into a screw threaded hole made in the jaw 22. The hood 25 is provided with a number of holes 27 arranged at different angles while the jaws 22 and 23 are provided with a number of grooves 28 adapted to register respectively with the holes 27. E designates the electrode which may be placed in any one of the holes 27 and its corresponding groove 28, which best adapt the electrode to the work which is being welded.

The operation of the device will be understood from the foregoing description in connection with the drawing. The electrode is inserted in the desired hole 27 and groove when the jaws 22 and 23 are in separated condition with the sleeve in downward position. Upon then turning the sleeve 21 upwardly to exert force on the jaw 23, the electrode will be firmly held in the head of the device. Some of the advantages of this invention are summarized as follows:

(1) Simplicity of design and construction with few movable parts.

(2) Light in weight and can be handled by women welders of light stature; thereby less tiring and less loss of energy.

(3) Immovable contact connection thereby eliminating possibility of welding rod moving and creating an arc that would burn up holder head.

(4) Sound contact connection prevents oxidation, plus fusing of contact points, thereby permitting a constant flow of electric current.

(5) Abuse proof, as holder will withstand being cast aside or thrown down, without danger of damage as it is compact and completely insulated from end to end.

(6) Will permit the maximum use or burning down to within 1" of welding rods, thus creating a saving in valuable steel or electrodes.

(7) Cheapness of materials used in constructing the holder, thereby saving on the use of valuable metals now so urgently needed.

(8) Low cost construction makes it possible to provide shipyards with a ready supply of holders on quick notice, thereby speeding up the shipbuilding program, because of the quick assembly.

(9) Holder head permits rods to be held firmly at any and all angles, thereby making it possible to weld from any standing, kneeling, sitting or prone position of the operator.

(10) Holder head is arranged to take welding electrodes of different sizes, thus presenting a universal holder.

(11) Heads can be made to take larger or any special size electrodes desired without affecting the amperage resistance.

(12) Due to the small number of parts, the holder is firmly and sturdily made, and will withstand heavy abuse with a minimum of repairs or replacements.

(13) Holder simplifies welding operation because of the easy method of holding the handle 6 in the hand in a fast position so that an apprentice of little training can perfect a weld.

I claim:

1. A holder for welding electrodes comprising a tube of insulating material, a conducting member held in said tube, means at the lower end of said conducting member for holding the end of a lead-in cable, a fixed jaw integral with the upper end of said conducting member whereby direct passage for current is provided, a jaw movably attached to said fixed jaw, said conducting member being screw threaded below said jaws, a separate screw threaded sleeve engaging said screw threads and adapted to be turned thereon to engage said movable jaw and move it toward said fixed jaw to firmly grip the electrode, and a covering of insulating material around said sleeve.

2. A holder for welding electrodes comprising a tube of insulating material, a conducting member composed of an upper element and a lower element adapted to be secured together and held in said tube, means at the lower end of said lower element for holding the end of a lead-in cable, a fixed jaw integral with the upper end of said upper element whereby direct passage for current is provided, a jaw movably attached to said fixed jaw, said upper element being screw threaded below said jaws, a separate screw threaded sleeve engaging said screw threads and adapted to be turned thereon to engage said movable jaw and move it toward said fixed jaw to firmly grip the electrode, and a covering of insulating material around said sleeve.

3. A holder for welding electrodes comprising a tube of insulating material, a conducting member held in said tube, means at the lower end of said conducting member for holding the end of a lead-in cable, a fixed jaw integral with the upper end of said conducting member whereby direct passage for current is provided, a jaw movably attached to said fixed jaw, said conducting member being screw threaded below said jaws, a separate screw threaded sleeve engaging said screw threads and adapted to be turned thereon to engage said movable jaw and move it toward said fixed jaw to firmly grip the electrode, a hood of insulating material secured around said jaws, and a covering of insulating material around said sleeve extending beyond the ends thereof, said covering fitting over the upper portion of said tube and over the lower portion of said hood for all operating positions of said sleeve.

4. A holder for welding electrodes comprising a tube of insulating material, a conducting member composed of an upper element and a lower element adapted to be secured together, a screw passing through the upper portion of said tube into the intermediate portion of said upper element, means at the lower end of said lower element for holding the end of a lead-in cable, a fixed jaw integral with the upper end of said upper element whereby direct passage for current is provided, a jaw movably attached to said fixed jaw, said upper element being screw threaded below said jaws, a separate screw threaded sleeve engaging said screw threads and adapted to be turned thereon to engage said movable jaw and move it toward said fixed jaw to firmly grip the electrode, a hood of insulating material secured around said jaws, and a covering of insulating material around said sleeve extending beyond the ends thereof, said covering fitting over the upper portion of said tube and over the lower portion of said hood for all operating positions of said sleeve.

5. A holder for welding electrodes comprising a cylinder of insulating material, a conducting member held in said cylinder, a fixed jaw and a hinged jaw on the lower end of said conducting member, the latter being screw threaded above said jaws, a screw threaded sleeve engaging said screw threads and adapted to be turned thereon to engage said hinged jaw whereby said hinged jaw may be moved toward said fixed jaw to firmly grip the end of a lead-in cable, a fixed jaw and a hinged jaw on the upper end of said conducting member, the latter being screw threaded below said jaws, and a screw threaded sleeve engaging said screw threads and adapted to be turned thereon to engage said hinged jaw whereby said hinged jaw may be moved toward said fixed jaw to firmly grip the electrode.

ANDREW D. CLYBURN.